United States Patent

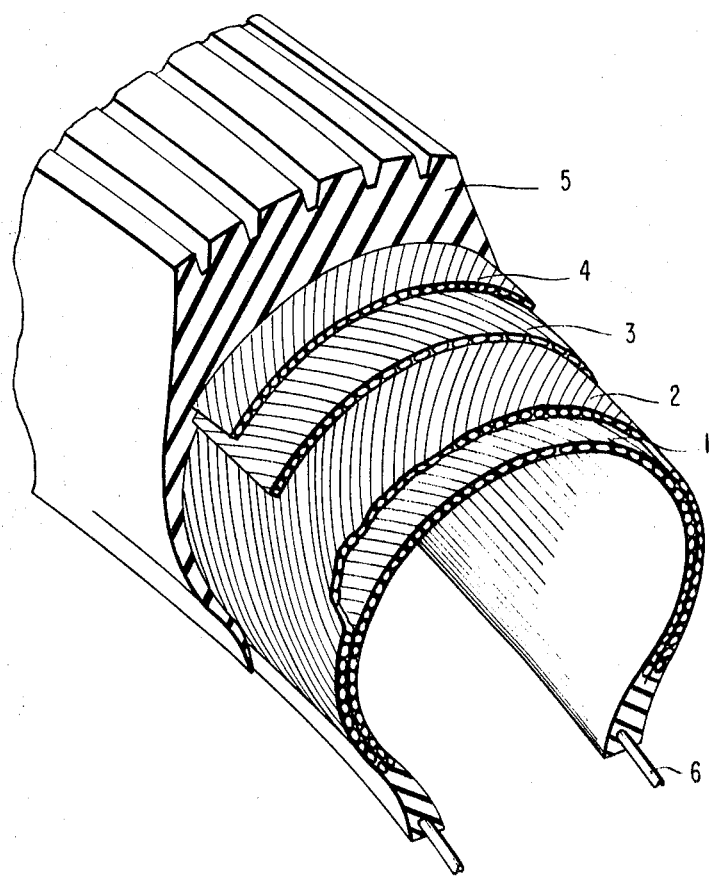

[11] 3,589,424

[72] Inventors: Shiro Sasaki, Toyonaka-shi; Narajiro Shibata, Suita-shi; Yoshiaki Takami, Suita-shi, all of, Japan
[21] Appl. No.: 718,912
[22] Filed: Apr. 4, 1968
[45] Patented: June 29, 1971
[73] Assignee: The Toyo Rubber Industry Co., Ltd. Nishi-Ku, Osaka, Japan
[32] Priority: Apr. 22, 1967
[33] Japan
[31] 42/25969

[54] PNEUMATIC TIRE
9 Claims, No Drawings
[52] U.S. Cl. ................................................. 152/354
[51] Int. Cl. ................................................. B60c 9/10
[50] Field of Search .................................... 152/354, 355, 356, 357; 260/5

[56] References Cited
UNITED STATES PATENTS
3,060,989  10/1962  Railsback ................ 260/5
3,364,156  1/1968   Kraus ..................... 260/5
3,426,825  2/1969   Leibee .................... 152/354

FOREIGN PATENTS
1,054,855  4/1964   Great Britain ........... 260/5

Primary Examiner—James B. Marbert
Attorney—Sughrue, Rothwell, Mion, Zinn & Macpeak ABSTRACT: A pneumatic tire having a tread rubber compound of a vulcanizable rubber composition comprising 100 parts by weight of a rubber containing at least 20 percent by weight of a stereo-regular polybutadiene or stereo-regular SBR incorporated with from 40 to 100 parts by weight of a high structure carbon black of particle sizes not exceeding 30 millimicrons; a polyester casing ply cord whose angle is within the range of 30° to 45°; and a breaker cord consisting of a material having a higher modulus and a lower growth than said polyester casing, the angle of said breaker cord being within the range of 25° to 40° but always at least 2° smaller than the angle of said casing ply cord.

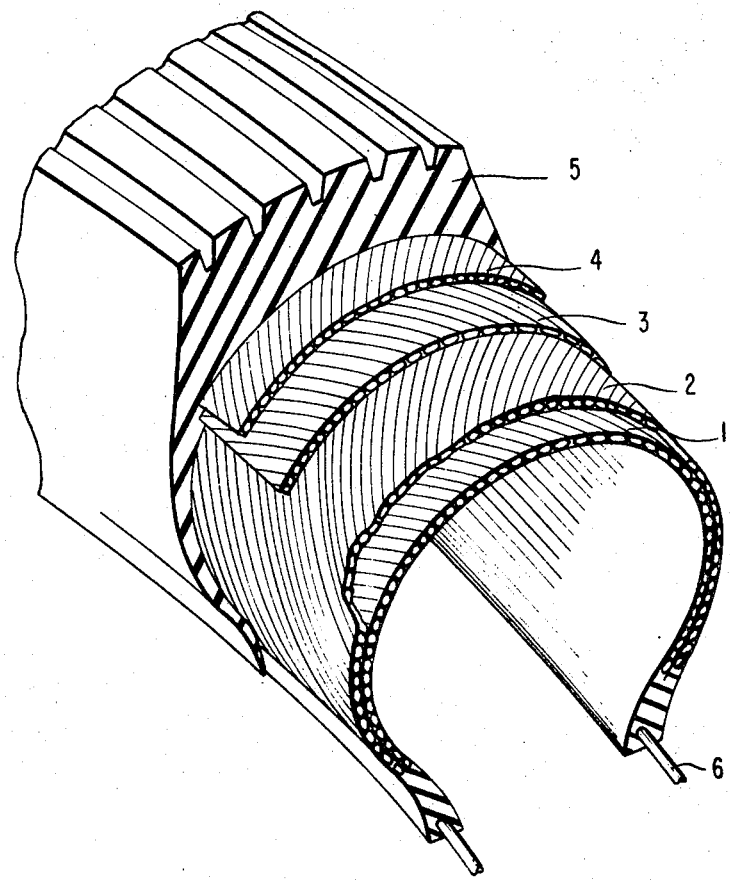

PNEUMATIC TIRE

BACKGROUND

1. Field of the Invention

This invention relates to a pneumatic tire having excellent abrasion resistance. More particularly, it provides a pneumatic tire having special material and tire cord ply structure which are adopted for giving excellent abrasion resistance.

The tire in accordance with the present invention is characterized by a tread rubber compound, a combination of a ply material forming breaker layer and that forming casing layer, and an angle of each ply cord and a relationship between the magnitudes thereof.

2. Description of the Prior Art

There have hitherto been made various investigations of abrasion resistance to improve tires. It is know that a rubber compound comprised, as main ingredient, of a stereo rubber such as stereo-regular polybutadiene rubber or stereo-regular SBR other than general purpose rubbers such as natural rubber or emulsion polymerized SBR have good tread wear. A tire formed of such a rubber compound is, however, not satisfactory yet with respect to tread wear resistance under severe conditions to which it may be submitted. Polyester, steel and glass fibre as well as rayon and nylon have been used in tire cords.

In the manufacture of tires by choosing appropriate ones from the existing various materials and applying them to each part of a tire, it is known that, as a tread rubber composition having an improved abrasion resistance, a rubber material comprised mainly of either a stereo-regular polybutadiene or a stereo-regular SBR is most superior. However, the influences of various factors other than the rubber material, such as cord materials used in casing layers and breaker layers of tires and the structure of reinforcing layers on the abrasion resistance of tires have not been made clear yet. Accordingly, the use of such rubber material has not always brought about an expected improvement in the abrasion resistance of tires which is a composite of these factors.

SUMMARY

The present invention provides a pneumatic tire having an excellent abrasion resistance in which the materials used will exhibit most highly their strong points due to an optimum combination of tread rubber material, cord material and the structure of reinforcing layers. D

BRIEF DESCRIPTION OF THE DRAWING

The drawing is a perspective view of the tire of the present invention illustrating portions of the various elements thereof in cross section. In the drawing, 1 and 2 are each casing plies, 3 and 4 are each breaker plies, 5 is the tread and 6 is the bead wire.

DESCRIPTION OF THE PREFERRED EMBODIMENTS

In the tire of the present invention, the tread rubber compound consists of a vulcanizable rubber compound prepared by incorporating 100 parts by weight of a rubber containing at least 20 percent by weight of a stereo-regular polybutadiene or stereo-regular SBR with from 40 to 100 parts by weight of a high structure carbon black of particle sizes not exceeding 30 millimicrons. Particularly, the term "high" structure carbon black" means HAF, SAF and ISAF carbon blacks which have particle sizes not exceeding 30 millimicrons and dibutyl phthalate absorptions, as measured in accordance with ASTM D-2414-65T, of at least 120 cc./100 gr. in case of HAF grade and at least 125 cc./100 gr. in cases of SAF and ISAF grades. The casing ply cord is a polyester cord and the breaker cord is formed of a material having higher modulus and lower growth than said polyester. The angle of the breaker cord is in the range of 25° to 40°, the angle of the casing ply cords is in the range of 30° to 45° and the angle of the breaker cord is at least 2° smaller than that of the casing ply cord.

Although it is necessary for facilitating dispersion of carbon black and other chemicals to incorporate a requisite minimum amount of a softener in the compound, the use of excessive softener should be avoided because it may result in lowering the abrasion resistance. The amount of the softener, therefore, should be confined within the range not exceeding about 70 percent, preferably 15 percent by weight of carbon black.

The stereo-regular polymer being incorporated in the tread rubber in the amount of at least 20 percent by weight includes those having cis-content of butadiene units of as low as about 30 mol percent, as high as about 95 mol percent and as very high as 98 mol percent or more. Such stereo-regular polybutadiene and stereo-regular SBR may be used either alone or in mixture. The stereo-regular SBR suitably used are those of styrene content not exceeding 30 mol percent.

The rest of the rubber component in the tread rubber compound may be such polymers that be compatible with the stereo-regular polybutadiene or stereo-regular SBR, such as natural rubber, synthetic polyisoprene or emulsion polymerization SBR.

It has now been discovered that, although the vulcanizable tread rubber compound of the present invention as mentioned above provides by itself a tire having fairly good abrasion resistance in comparison with an ordinary tread rubber compound consisting of a natural rubber, emulsion polymerization SBR or blend of a natural rubber and an emulsion polymerization SBR incorporated with 50 to 70 phr. of a HAF or ISAF black of normal structure, further improvement in abrasion resistance of tires is obtained by using as casing cord a polyester cord of a relatively high modulus and as breaker cord a cord of a higher modulus and a lower growth than the casing ply cord, and by so selecting the angles of the cord plies that the angle of the breaker cord is at least 2° smaller than that of the casing cord, the angle of the breaker cord is in the range of 25° to 40° and the angle of the casing ply cord is in the range of 30° to 45°.

The term "angle of cord" or "cord angle" means, as far as the description of this specification is concerned, the angle at which the casing or breaker cord meets the centerline in the peripheral direction of tire in the crown of the tire.

Material which is most suitably used from the standpoint of high modulus and low growth as the casing cord in the pneumatic tire of the present invention and having an excellent abrasion resistance is a high tenacity polyester cord. As polyester cords have poor adhesion characteristics to rubber it is necessary to apply thereto a proper treatment for enhancing adhesive property.

The material to be used as the breaker cord has a higher modulus and a lower growth than said casing ply cord. Such a material may be extra high modulus rayon cord, glass fibre cord, steel cord, etc. though there may be used those formed of polyester fibers, super high tenacity rayon or polyvinyl alcohol fibers by applying high stretching or drawing and/or lowering the number of twist to impart a high modulus and a low growth during manufacture thereof.

A very high abrasion resistance is obtained in the tire of the present invention by employing a combination of tread rubber compounding ingredients giving a compound having a good abrasion resistance and in addition thereto, by selecting special materials as casing ply cord and breaker cord and special cord angles. Accordingly, the relative movements of tread ply is restricted by confirming the angles of casing ply cord and of breaker cord and materials forming them within the ranges as defined by the present invention to make the tread rigid.

Summarizing the characteristics of the tire of the present invention:

1. there is used a tread rubber compound comprising a rubber component containing at least 20 percent by weight of a stereo-regular butadiene rubber and incorporating as reinforcing agent a high structure carbon black, 2. there is used as casing ply cord a polyester cord and as breaker cord a cord formed of a material having a higher modulus and a lower growth than said polyester, and 3. the angle of casing ply cord is set within the range of 30° to 45° and the angle of breaker cord within the range of 25° to 40° with provision that the angle of breaker cord is always at least 2° smaller than that of casing ply cord.

Some embodiments of the pneumatic tire of the present invention will now be illustrated by the following examples.

Example 1

Service tests were made on a 700-13 4PR tire for passenger cars.

I.—DETAILS OF THE TIRE

|  | Formula 1 | Formula 2 |
|---|---|---|
| SBR 1712 | 96.25 | 137.5 |
| Cis-polybutadiene (BR-01) | 30.0 |  |
| HAF black |  | 75.0 |
| High structure HAF (particle size 28 milimicrons) | 75.0 |  |
| Zinc white | 5.0 | 5.0 |
| Stearic acid | 2.0 | 2.0 |
| High aromatic process oil | 16.25 | 5.0 |
| Microcrystalline wax* | 2.0 | 2.0 |
| Antioxidant 810-NA* | 1.5 | 1.5 |
| Accelerator MAS* | 1.0 | 1.0 |
| Sulfur | 1.8 | 1.8 |

Note: * Products of Ohuchi Shinko Company, Japan.

Tire A (tire of the present invention)
1. Tread rubber compound: Formula 1.
2. Casing ply: Formed at a cord angle of 32° of two plies of a cord fabric of a gauge of 50/5 cm. of a cord of first twist of 39.0 turns/10 cm. and a second twist of 36.0 turns/10 cm. formed of polyester yarn of 1,000 d/3.
3. Breaker ply: Formed at a cord angle of 26° of one ply of a cord fabric of a 1,650 d/2 EHM (extra high modulus) rayon yarn of a number of first twist of and a second twist of 25.0 turns/10 cm.; the gauge of 30 yarns/5 cm.

Tire B (Tire of the present invention)
1. Tread rubber and 2.) Casing ply are the same with the tire A.
3. Breaker ply: Formed of two plies of a cord fabric, a gauge of 28 yarns/5 cm, formed of a glass fiber yarn of an ECG 150 10/0 of a number of final twist of 6 twists/10 cm.

1. Tread rubber compound: Formula 2.
2. Casing ply: Cord angle of 36°, two plies of a cord fabric of a gauge of 50 yarns/5 cm. formed of a 1,260 d/2 nylon yarn of a number of first twist of 39.0 turns/10 cm. and of second twist of 39.0 turns/10 cm.
3. Breaker ply: Cord angle of 38°, one ply formed of a 1,000 d/2 polyester yarn of a number of first turn and of second twist of 30.0 turns/10 cm., 30 yarns/5 cm. gauge.

Tire D (Control)
1. Tread rubber compound: Formula 1.
2. Cord angle of 36°, four plies of a gauge of 46 yarns/5cm. formed of a 1,000 d/2 polyester yarn of a number of first twist and of second twist of 47.0 turns/10 cm.
3. Breaker ply: Cord angle of 36°, one ply of a gauge of 30 yarns of a 840 d/2 nylon yarn of a number of first twist and of second twist of 47.0 turns/10 cm.

Tire E (Control)
1. Tread rubber compound: Formula 1.
2. Casing ply: Cord angle of 36°, four plies each of 44 yarns/5 cm. formed of a 840 d/2 nylon cord of a first twist and of a second twist of 47.0 turns/10 cm.
3. Breaker ply: Cord angle of 40°, one ply of a gauge of 30 yarns/5 cm. formed of a 840 d/2 nylon yarn of a number of first twist and of second twist of 47.0 turns/10 cm.

II Datum of Tire Abrasion:

Each 16 of the tires A, B, C, D and E were fitted to 20 cars in combinations by two, and the cars were driven. The relative distances over which the cars ran until the unit thickness of the tire tread had been worn out were measured and indicated in the term of "treadwear index" (per 1 mm. wear of tread) on the basis of the treadwear index of the tire E of 100. Accordingly, the larger the index, the better the abrasion resistance.

|  | Tires of the present invention | | Tires control | | |
|---|---|---|---|---|---|
|  | A | B | C | D | E |
| Tread-wear index | 139 | 127 | 94 | 108 | 100 |

From the above table, it is evident that the tires in accordance with the present invention are superior in abrasion resistance to the control tires C, D and E which do not meet any one of the necessary conditions of the present invention: the control tire C meets the conditions of the angles of casing ply and breaker ply, but the relationship between the magnitude of said angles is adverse and is different in material forming said ply cords and tread rubber compound; the control tire D meets the necessary conditions of the present invention in the tread rubber composition and the angles of the cord plies, but differing in the material of the breaker ply cord and the cord angle of the breaker cord ply is equal to that of the casing ply; and the control tire E meets the conditions of the present invention concerning with the tread rubber composition, but different in the materials forming the cords and adverse in the magnitudes of the cord angles.

EXAMPLE 2

Road tests were made on truck and bus tires. The tread rubber compounds were prepared in accordance with the following recipes.

T/B RUBBER RECIPE

|  | Formula 3 (this invention) | Formula 4 (control) |
|---|---|---|
| RSS #3 | 40.0 | 100 |
| Oil-extended cis-polybutadiene [1] | 82.5 |  |
| ISAF black |  | 45.0 |
| High-structure ISAF black of particle size of 25 milimicrons | 65.0 |  |
| Zinc white | 5.0 | 5.0 |
| Stearic acid | 3.0 | 3.0 |
| Aromatic process oil [2] | 5.0 | 5.0 |
| Antioxidant 810-NA [3] | 2.0 | 1.5 |
| Accelerator MAS [4] | 0.9 | 0.5 |
| Vulcanization retarder, Sconoc [5] | 0.5 | 0.5 |
| Sulfur | 1.5 | 1.5 |

Note:
[1] Nippol BR 1441, Japan Geon Co.
[2] Sonic Process oil X-140, Nippon Mining Co.
[3] Noclac 810-NA, Ohuchi Shinko Kegaku Co.
[4] Noccelar MSA, Ohuchi Shinko Kagaku Kogyo Co.
[5] Sconoc, Ohuchi Shinko Kagaku Kogyo Co.

I Details of the Tires:
Tire A: (Tire of the present invention) Size 900 x 20 14 PR
1. Tread rubber compound: Formula 3.
2. Casing ply: Formed at a cord angle of 38° of six inner plies of a cord fabric composed, at a gauge of 48 cords/5 cm. of a cord of a number of first twist of 39.0 turns/10 cm. and of second twist of 36.0 turns/10 cm. consisting of 1,000 d/3 polyester yarn, and two outer plies of a cord fabric of a gauge of 40 cords/5 cm. composed of the same cord as the inner cord fabric.
3. Formed at a cord angle of 34° of two plies of a cord fabric of a gauge of 30 cords/5 cm. composed of a 1,650 d/2 EHM rayon of a number of first twist and of second twist of 25.0 turns/10 cm.

Tire B: (Control) Size 900×20 14 PR
1. Tread rubber compound: Formula 4.
2. Casing ply: Same with the tire A.
3. Breaker ply: Formed at a cord angle of 40° of two plies of a cord fabric of a gauge of 30 cords/5 cm. composed of an 840 d/2 nylon cord of a number of first twist and of second twist of 47.0 turns/10 cm.

Tire C: (Control) Size 900×20 14 PR.
1. Tread rubber compound: Formula 4.
2. Casing ply: formed of six inner plies of a cord fabric of a gauge of 50 cords/5 cm. composed of a 1,260 d/2 nylon cord of a number of first twist and of second twist of 39.0 turns/10 cm. and 2 outer plies of a cord fabric of a gauge of 38 cords/5 cm. composed of the same cords with the inner cord fabric.
3. Breaker ply: Formed at a cord angle of 42° of 2 plies of a cord fabric of a gauge of 30 cords/5 cm. composed of an 840 d/2 nylon cord of a number of first twist and of second twist both of 47.0 turns/10 cm.

II Datum of Tire Abrasion:

Twenty of tires A and 20 of tires B were fitted to 10 buses by twos and 20 of tires A and 20 of tires C were fitted to 10 buses by twos. The treadwear index of each of the A, B and C tires which indicated a relative mileage until 1 mm. thickness of tread rubber was worn out was indicated in the following table.

|  | Tire of the present invention, A | Control B | Control C |
|---|---|---|---|
| Tread-wear index | 129 |  | 100 |
|  | 125 | 100 |  |
| On the basis of that of Tire C 100 | 129 | 103 | 100 |

The table indicates that the tire of the present invention has a very good wear resistance compared with the control tires.

What we claim is:
1. A pneumatic tire having:
   a. a tread rubber compound of a vulcanizable rubber composition comprising 100 parts by weight of a rubber containing at least 20 percent by weight of a stereo-regular polybutadiene or stereo-regular SBR incorporated with from 40 to 100 parts by weight of a high structure carbon black of particle sizes not exceeding 30 millimicrons;
   b. a polyester casing ply cord whose angle is within the range of 30° to 45°; and being
   c. a breaker cord consisting of a material having a higher modulus and a lower growth than said polyester casing, the angle of said breaker cord being within the range of 25° to 40° but always at least 2° smaller than the angle of said casing ply cord.

2. The pneumatic tire as in claim 1 in which the breaker cord is an extra high modulus rayon cord.
3. The pneumatic tire as in claim 1 in which the breaker cord is a glass fibre cord.
4. The pneumatic tire as in claim 1 in which the breaker cord is a steel cord.
5. The pneumatic tire as in claim 1 in which the angle of casing ply is within the range of 30° to 40°, the angle of breaker cord is within the range of 25° to 35° and the angle of the latter is smaller by at least 4° than that of the former.
6. A pneumatic tire having:
   a. a tread rubber composition comprising 100 parts by weight of a rubber containing at least 20 percent by weight of a stereo-regular polybutadiene or stereo-regular SBR incorporated with from 40 to 100 parts by weight of a high structure carbon black having particle sizes not exceeding 30 millimicrons and selected from the group consisting of HAF black of a dibutyl phthalate absorbency of at least 120 cc./100 gr., SAF black of a dibutyl phthalate absorbency of at least 125 cc./100 gr., and ISAF black of a dibutyl phthalate absorbency of at least 125 cc./100 gr., the dibutyl phthalate absorbencies being measured in accordance with ASTM D-2414-65T;
   b. a polyester casing ply cord whose angle is within the range of 30° to 45°; and
   c. a breaker cord consisting of a material having a higher modulus and a lower growth than said polyester casing, the angle of said breaker cord being within the range of 25° to 40°, but always at least 2° smaller than the angle of said casing ply cord.

7. The pneumatic tire as in claim 6 in which the high structure carbon black is a HAF black of a dibutyl phthalate absorbency of at least 120 cc./100 gr. as measured in accordance with ASTM D-2414-65T.
8. The pneumatic tire as in claim 6 in which the high structure carbon black is a SAF black of a dibutyl phthalate absorbency of at least 125 cc./100 gr. as measured in accordance with ASTM D-2414-65T.
9. The pneumatic tire as in claim 6 in which the high structure carbon black is an ISAF black of a dibutyl phthalate absorbency of at least 125 cc./100 gr. as measured in accordance with ASTM D-2414-65T.